(12) United States Patent
Zhang

(10) Patent No.: US 7,611,637 B2
(45) Date of Patent: Nov. 3, 2009

(54) METHOD FOR TREATING CONTAMINATED WATER

(75) Inventor: Wei-xian Zhang, Bethlehem, PA (US)

(73) Assignee: Lehigh University, Bethlehem, PA (US)

( * ) Notice: Subject to any disclaimer, the term of this patent is extended or adjusted under 35 U.S.C. 154(b) by 584 days.

(21) Appl. No.: 10/567,276

(22) PCT Filed: Aug. 6, 2004

(86) PCT No.: PCT/US2004/025584

§ 371 (c)(1),
(2), (4) Date: Sep. 19, 2006

(87) PCT Pub. No.: WO2005/014492

PCT Pub. Date: Feb. 17, 2005

(65) Prior Publication Data

US 2007/0158275 A1 Jul. 12, 2007

(51) Int. Cl.
*C02F 1/68* (2006.01)

(52) U.S. Cl. .................. 210/749; 210/600; 210/748; 210/747; 204/157.15; 422/128; 422/127; 422/900

(58) Field of Classification Search .................. 210/600, 210/748, 747, 739, 757, 304; 422/128, 127, 422/900; 204/157.15
See application file for complete search history.

(56) References Cited

U.S. PATENT DOCUMENTS

| 3,674,461 | A | | 7/1972 | Farnand et al. | |
|---|---|---|---|---|---|
| 3,727,760 | A | * | 4/1973 | Soriano et al. | 210/101 |
| 4,637,990 | A | | 1/1987 | Torobin | |
| 5,543,059 | A | | 8/1996 | Howson et al. | |
| 6,013,232 | A | * | 1/2000 | Quinn et al. | 422/128 |
| 6,196,314 | B1 | * | 3/2001 | Chen | 166/275 |
| 6,207,114 | B1 | * | 3/2001 | Quinn et al. | 422/128 |
| 6,664,298 | B1 | * | 12/2003 | Reinhart et al. | 516/22 |

FOREIGN PATENT DOCUMENTS

| WO | WO 9849106 | A1 | * | 11/1998 |
|---|---|---|---|---|
| WO | WO 03101541 | A1 | * | 12/2003 |

\* cited by examiner

*Primary Examiner*—Walter D Griffin
*Assistant Examiner*—Cameron J Allen
(74) *Attorney, Agent, or Firm*—RatnerPrestia

(57) ABSTRACT

Zero valent iron particles (14) having enhanced surface area are used to treat contaminated groundwater in-situ or above ground. Hollow and/or porous zero valent iron particles (14) having a generally spherical shape and porous surface are produced using a sacrificial substrate (10) and thermal treatment.

17 Claims, 5 Drawing Sheets

METHOD FOR TREATING CONTAMINATED WATER

THIS APPLICATION IS A U.S. NATIONAL PHASE APPLICATION OF PCT INTERNATIONAL APPLICATION PCT/US2004/025584 filed on Aug. 6, 2004.

BACKGROUND OF THE INVENTION

This invention relates to the purification of contaminated water, in particular treatment of groundwater and/or wastewater discharged from industrial and commercial facilities, using iron particles.

A common method for cleaning contaminated groundwater is to build in-ground barriers or curtains with reactive or adsorptive materials. Contaminants are removed when the contaminated water passes through the reactive or adsorptive materials by various physical, chemical and/or biological mechanisms. Such treatment curtains are often called "permeable reactive barriers" (PRBs) as they are usually more water permeable than the native soil/sediment materials. The barriers are semi-permanent or replaceable units that are installed across the flow path of groundwater.

The treatment walls (curtains or barriers) are often installed along with other components, which divert the flow of groundwater through the treatment walls. For example, low permeability cutoff walls can be built adjacent to the treatment walls. The cutoff walls are much less permeable to water so that contaminated water is "funneled" into the treatment wall. This is normally termed the "funnel-and-gate" system in which the funnel is the low permeability wall(s) and the gate is the reactive barrier.

The foremost advantage of the above method is that the contaminated water can be treated in-situ without the need for it to be pumped out for external treatment and disposal. One major disadvantage of the method is the high cost of building the in-ground curtain because of the large amount of soil and sediments that must be dug out and disposed of to accommodate the reactive or adsorptive materials. The cost is especially high for deep aquifers.

Common adsorptive materials include activated carbon and various carbon-based materials. Microorganisms attached to solid materials have also been used in the reactive barriers for treatment of various contaminants such as petroleum hydrocarbons.

Many reactive materials have been suggested. A very fascinating reactive material is metallic iron in the form of iron fillings or powders. The use of iron (metallic or zero-valent iron) for the purification of groundwater impacted by various contaminants has received much research attention over the past decade. It has been shown that iron can react with a wide variety of naturally occurring and man-made contaminants. For example, iron is effective for the transformation of ubiquitous organic solvents such as carbon tetrachloride ($CCl_4$), chloroform ($CHCl_3$), trichloroethene ($C_2HCl_3$), and tetrachloroethene ($C_2Cl_4$). For example trichloroethene can be reduced according to the following reaction:

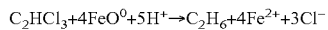
$$C_2HCl_3 + 4FeO^0 + 5H^+ \rightarrow C_2H_6 + 4Fe^{2+} + 3Cl^-$$

Another technique for treating contaminated groundwater in its native place (in situ) involves the direct application of very fine iron powders. The fine iron particles have sizes typically smaller than 100 nanometers, which is at least 10 times smaller than a typical bacterial cell or one thousand times thinner than human hair. These tiny particles are now commonly called nanoparticles. Due to their small sizes, nanoparticles sink slowly and could remain in suspension for extended periods of time. Slurries or suspensions of the iron nanoparticles can be made by mixing the nanoparticles with water, and can be introduced into groundwater by pumping or natural flow. This method has been shown to be effective for cleaning contaminated groundwater.

BRIEF DESCRIPTION OF THE INVENTION

The present invention in its broadest aspect provides generally spherical generally hollow zero valent iron particles having a surface porosity greater than 0.1.

Particles according to the invention can be used to treat contaminated groundwater in-situ.

According to another embodiment of the invention an interceptor well(s) packed with porous iron particles with enhanced surface area can be used to treat contaminated groundwater in-situ.

In yet another embodiment of the invention packed bed containers can be charged with porous and/or hollow zero valent iron particles with enhanced surface area to treat contaminated groundwater above-ground.

Therefore, in one aspect the present invention is a method for treatment or remediation of soil or groundwater contaminated with unwanted pollutants comprising the steps of: a) preparing generally spherical zero valent iron particles having a diameter no larger than about ten millimeters and a porosity greater than 0.1; and b) placing the particles in the soil or a path of groundwater flow; whereby the particles effect reduction of the pollutants.

In another aspect the present invention is a method for preparing porous iron particles having a size up to 10 millimeters comprising the steps of: a) preparing a generally spherical substrate of a material that can either be converted to volatile matter or a gas at elevated temperature or chemically removed by, e.g. dissolution; b) coating the substrate with metallic iron to form a substantially continuous layer at least 0.25 nm thick; c) exposing the coated substrate to a temperature high enough to remove the substrate to form a hollow iron particle; and d) reducing iron oxide in the particle to metallic iron. The layer of metallic iron deposited in step b) should be of a thickness that will maintain substantially the shape of the particle after steps c and d are completed.

In yet another aspect the present invention is a method for treatment or remediation of groundwater contaminated with unwanted pollutants comprising the steps of: a) preparing generally spherical zero valent iron particles having a diameter no larger than about ten millimeters and a porosity greater than 0.1; b) charging the particles into a receptacle having an inlet and an outlet defining a pathway through the particles, c) introducing the polluted groundwater into the inlet; and d) recovering cleaned water from the outlet.

In a further aspect the present invention is a generally spherical hollow zero valent iron particle having a diameter no larger than about ten millimeters in diameter and having a porosity greater than 0.1.

In still another aspect the present invention is a zero valent iron particle fabricated by: a) preparing a generally spherical substrate of a material that can be converted to volatile matter or a gas at elevated temperature; b) coating the substrate with metallic iron to form a substantially continuous layer at least 0.25 nm thick; c) exposing the coated substrate to a temperature high enough to remove the substrate to form a hollow iron particle; and d) reducing iron oxides in the particle to metallic iron.

BRIEF DESCRIPTION OF THE DRAWINGS

FIG. 9a is an enlarged schematic representation of a particle contained in the apparatus of FIG. 9.

FIG. 10a is an enlarged schematic representation of a particle introduced into the ground water flow via an injection well as shown in FIG. 10.

FIG. 11a is an enlarged schematic representation of a particle contained in the reactor of FIG. 11.

DETAILED DESCRIPTION OF THE INVENTION

The present invention relates to reactive treatment of contaminated groundwater by using a porous iron structure or matrix, regardless of particle size. It is within the scope of the invention to use particles having a size range from about 1 nanometer to 1 centimeter. Porous and/or hollow iron particles possess a larger surface area to effect contaminant removal and treatment. Porous and/or hollow iron particles also have higher water permeability. Furthermore, porous and/or hollow particles have higher mobility in groundwater.

It has long been known that iron corrodes when it is exposed to water and air. Water and oxygen in air are common oxidants. Metallic or zero-valent iron ($Fe^0$), on the other hand, is a moderate reducing reagent, which can react with dissolved oxygen and to some extent with water. It is also known that corrosion can be accelerated or inhibited by manipulating the environmental conditions and solid (metal) composition. For example, iron corrodes faster under acidic conditions (e.g., acid rain).

Many contaminants can use iron as a reductant so that the contaminant can be coupled to the iron oxidation reactions. Environmental applications of metallic iron have been accepted by both public and private users and by regulatory agencies, largely due to the lower costs and absence of any known toxicity induced by the use of iron.

A central aspect of the pollutant transformation by iron is that the chemical transformation reaction is mediated by the iron surface. In other words, contaminant molecules must first move onto the iron surface. Interactions with the metal surface then induce further molecular changes and eventually cause the breakdown of the contaminant molecules. The most important implication of this discovery is that the contaminant transformation depends on the availability of large amounts of iron surface area. The larger the iron surface area exposed to contaminant molecules, the higher the rate of contaminant destruction.

There are two general approaches to increase the surface area of materials: smaller size and porous structure. Given the same mass of a material, the smaller the grain size, the larger the surface area. Another approach is to fabricate porous or hollow structures so that the interior surface is exposed. A honeycomb is an example of porous material. Porous materials have been widely used in many industrial applications. For example, activated carbon is a well-known porous material used in drinking water purification. Porous membranes are commonly used in water filtration and chemical separation. Porous zeolites have been extensively used in many chemical processes.

The present invention relates to the use of materials, (e.g. iron), having large surface areas for water treatment. A combination of the above-described methods (smaller size and porous structures) are employed to increase the surface area of iron.

Figure 1A:
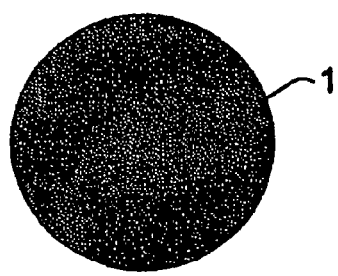
FIG. 1a is a schematic illustration of a solid iron particles.
Figure 1B:
FIG. 1b is a schematic illustration of a porous iron particle.

Porous materials are solids containing pores. FIG. 1a and FIG. 1b illustrate the difference between solid and porous iron materials. FIG. 1a is a schematic representation of a solid particle 1 and FIG. 1b is a schematic representation of a porous particle 2. For the purposes of the present invention, a porous material refers to a material with porosity exceeding 0.1.

Figure 2:
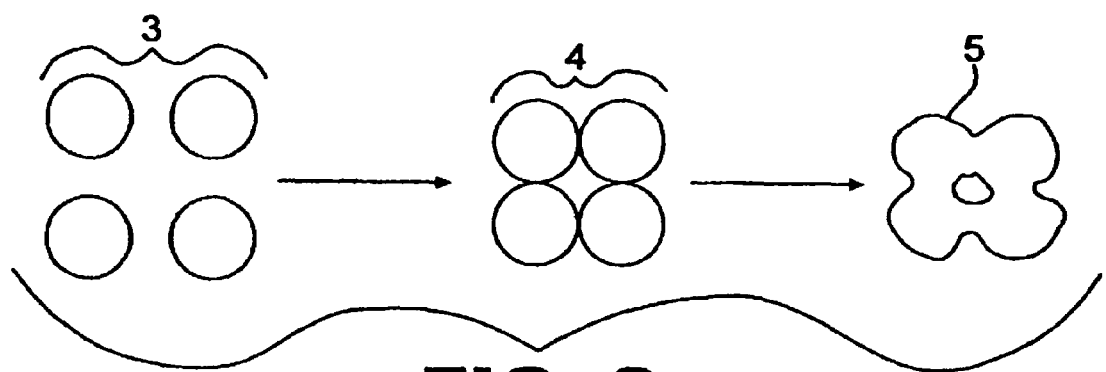
FIG. 2 is a schematic representation of a method of preparing porous materials by assembly and sintering of small building blocks of the materials.

A common method for producing porous materials is by assembling smaller size materials (the building blocks) into a larger porous structure, e.g., sintering smaller particles into larger and porous agglomerates. Powders and fibers can be used as the starting materials (the primary materials). The assembly is typically accomplished by compaction of powders at an elevated temperature below the melting point of the powder. However, compaction will reduce the surface area associated with the pores. FIG. 2 is a schematic representation of a pressing and sintering process. In FIG. 2 bracket 3 illustrates the particle before compaction, bracket 4 illustrates the particles after pressing (compaction) and bracket 5 illustrates particles after sintering.

Pore size of the porous agglomerate depends on the shape, size, and size distribution of the primary materials. Pore size of the porous agglomerates also depends on compaction time and parameters of the sintering process such as time, temperature and pressure.

Another commonly used method for the production of porous materials is the so-called sol-gel synthesis. Hydrolysis and subsequent polymerization of aqueous metal cations can lead to the precipitation of gels. In the case of ferric ion ($Fe(H_2O)_6^{3+}$) in mildly acidic solutions, the polymerization forms cationic colloidal spherules 2-4 nm in diameter. The nanoscale structures of $\gamma\text{-}FeO(OH)$ can be produced on a timescale of 100 seconds. The iron polymers lose a proton ($H^+$) and harden over time and could form a highly porous matrix.

According to the invention porous materials can be made with the use of a template in the form of a sacrificial substrate. For example, iron can be coated onto the surface of spherical particles made of organic polymers. After the iron solidifies on the surface, the iron and polymer composite is baked to burn out the polymer core, leaving a thin hollow shell of iron. The (template) substrate can be made of various compositions which can include surfactants, amphiphilic block copolymers, dendrimers, and/or biomolecules. The template can be removed by thermal or chemical treatment, leaving behind the porous metal and metal oxide structure.

Figure 3:
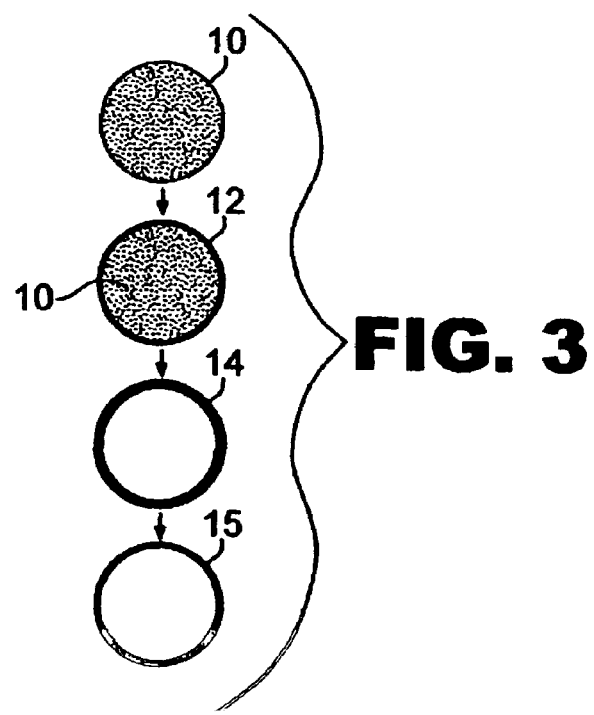
FIG. 3 is a schematic representation of the preparation of porous iron particles according to the present invention.

FIG. 3 is a schematic illustration of a method according to the invention for fabricating hollow porous iron particles. As shown in FIG. 3 a template or sacrificial substrate 10 is prepared with the desired shape and size. The substrate 10 is then coated with a layer of iron 12 by precipitation/deposition of iron on the substrate (template) 10. The coating process is such that the iron layer is deposited to a thickness, required for subsequent fabrication operations and effectiveness in use. A preferred thickness for the iron layer is at least 0.25 nm. After deposition or coating of the iron, the coated particle(s) is heated to a temperature sufficiently high (e.g. greater than 500° C.) to remove or drive off the substrate. Thereafter the resulting porous iron particle 14 is heated in a reducing atmosphere resulting in an iron particle 15 of zero valence.

Figure 4:
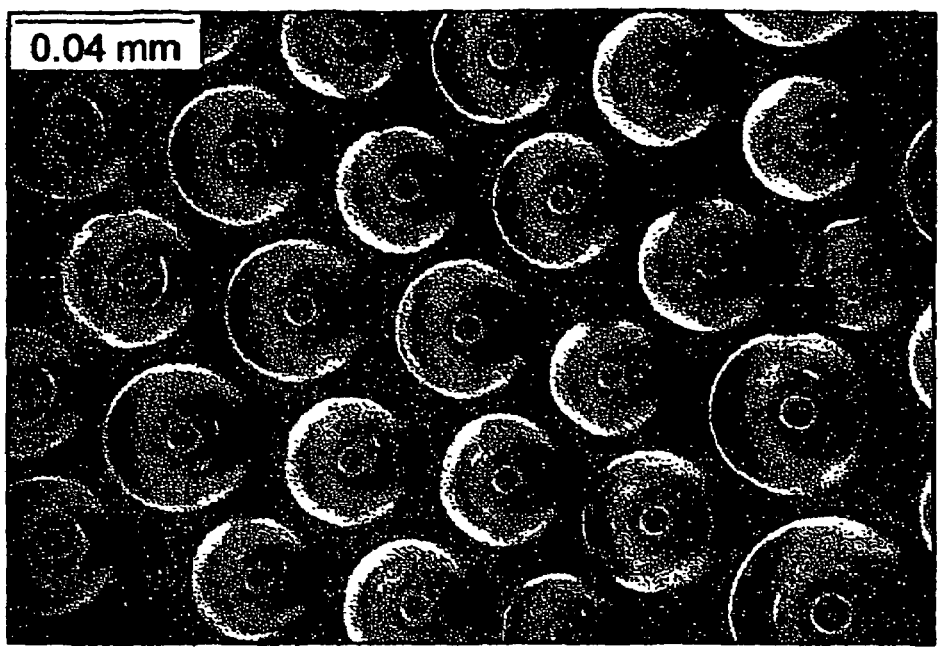
FIG. 4 is a photomicrograph at 100× magnification of polymeric resin beads useful as a sacrificial substrate for preparing porous iron particles according to the present invention.

Templates or substrates of desired sizes (e.g., from nanometer to centimeter scales) can be used. In general, the substrates are made from organic materials, which can be converted into volatile or gaseous matter under high temperature. Substrate materials may include ion exchange resins, polystyrene beads, latex particles etc. FIG. 4 shows images of cation exchange resin beads under magnification of 100×. The beads in FIG. 4 are polymeric resin beads obtained from Resin Tech and identified as CG8 having a diameter of approximately 0.3 nm. It is also within the present invention to use inorganic substrates such as clay and aluminum. Removal of inorganic substrates is typically achieved through chemical dissolution in using a solvent for the substrate. Adjusting the solution pH may also be used to dissolve the inorganic substrate.

Figure 5:
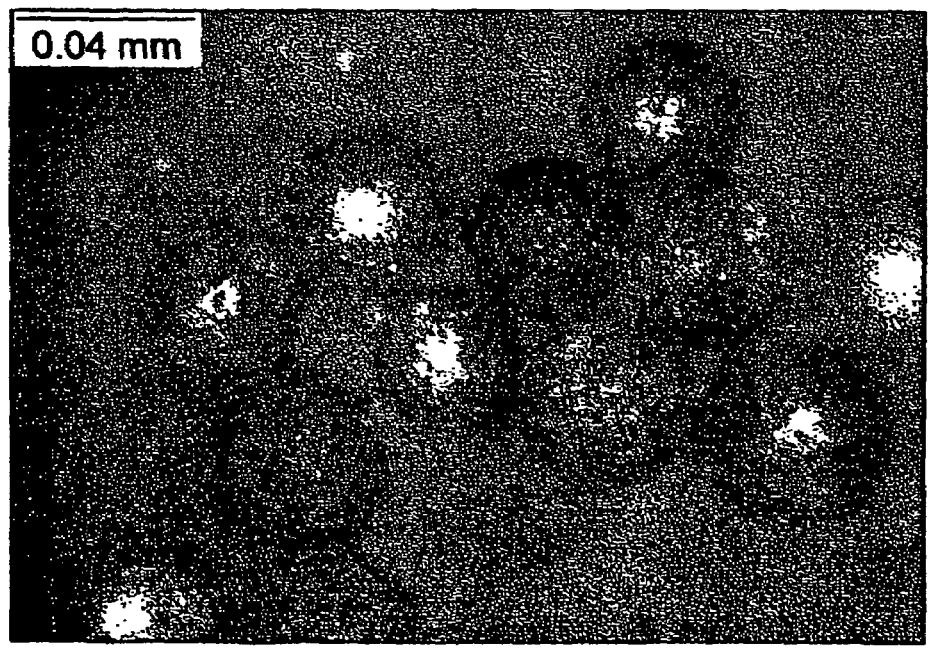
FIG. 5 is a photograph at 100× magnification of resin particles coated with iron and iron oxides according to the invention.

According to one aspect of the invention the substrate material is charged into a solution of iron [e.g., ferric (Fe(III) or ferrous (Fe(II)]. The iron is deposited on the surface of the template by increasing the solution pH and/or temperature to cause iron precipitation. Iron, especially ferric (Fe(III)) iron has relatively low solubility at high pH and temperature. Iron can also be deposited on the surface of the substrate or template by adding reagent(s), which causes reduction and subsequent precipitation of iron. For example, both ferric [Fe(III)] and ferrous [Fe(II)] iron can be readily reduced to metallic iron [Fe(0)] by borohydride iron $(BH_4)^-$. The reduced iron precipitates onto the template surface and forms a mono and/or multiple layer coating. FIG. 5 is a photomicrograph of a resin beads coated with iron and iron oxide.

Figure 6:
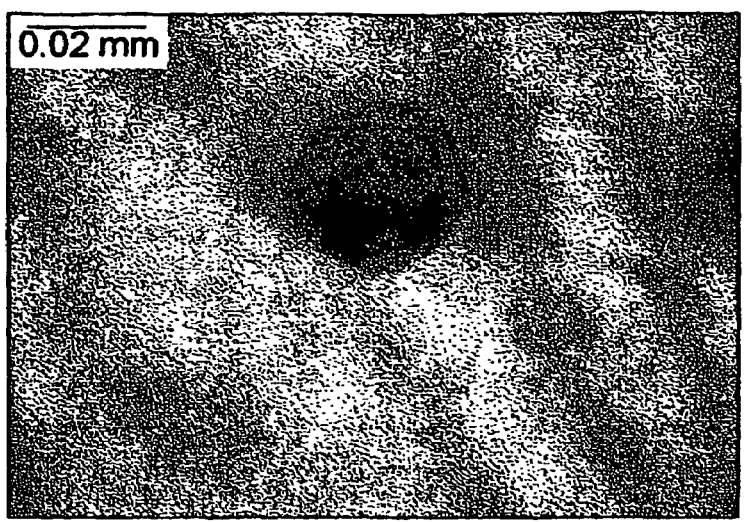
FIG. 6 are photomicrographs at 100× magnification showing hollow and porous iron particles according to the present invention.
Figure 6:
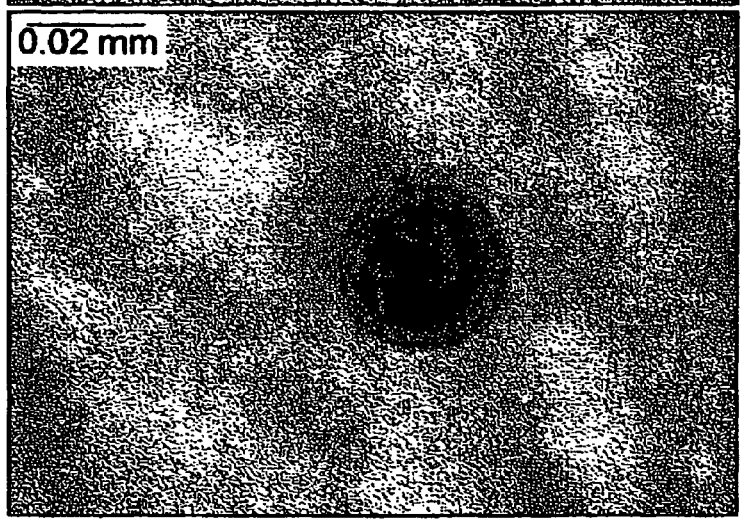

The composite of the substrate and iron coating is then heated in an oven at high temperature (>500° C.) to remove the template. This is sometimes referred to as calcination step. The temperature must be high enough to convert the template into gaseous matter and must be lower than the melting point of iron to avoid fusing or sintering of the particles. This process can be accomplished from a few minutes to a few hours depending the type of template (substrate) used. Typically, a porous and/or hallow structure is formed after this step such as illustrated by the particles shown in FIG. 6.

Figure 7:
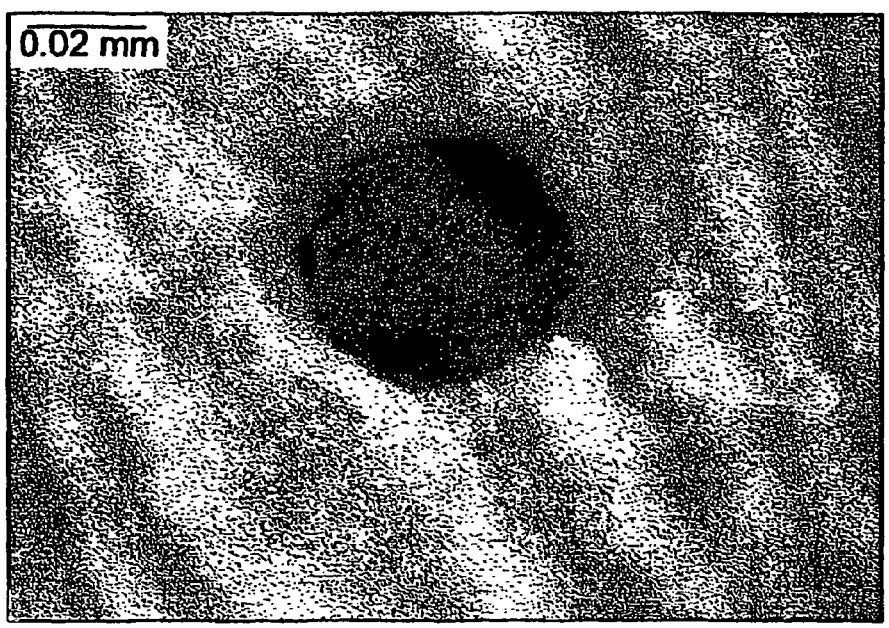
FIG. 7 is a photomicrograph at 200× magnification of a zero valent iron particle according to the present invention.
Figure 8:
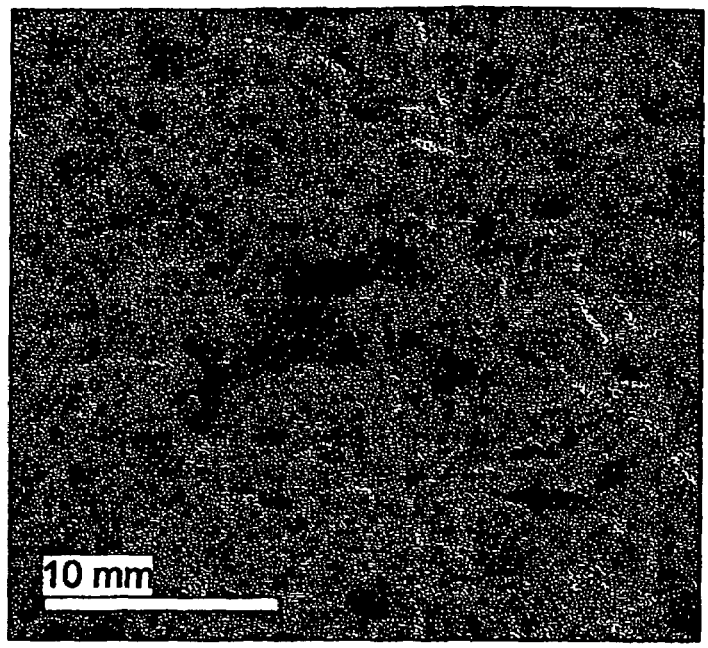
FIG. 8 is a scanning electron microscopy image the surface of a zero valent iron particle according to the present invention showing a sponge-like porous surface.

The porous structure is further reduced by a reductant (e.g., hydrogen) under elevated temperature (e.g., 300-500° C.). During this step iron oxides ($Fe_xO_y$) are reduced to metallic iron (Fe(0)). FIG. 7 is an image of a hydrogen reduced porous iron particles having a zero-valence. FIG. 8 is a scanning electron microscopy image of an iron particle surface illustrating the porous sponge-like surface of the particles.

The present invention is not limited in scope only to specific manufacturing methods or processes for producing porous and/or hollow structured iron. In addition to the particles and their manufacture the present invention relates to the use of porous iron in permeable reactive barriers, direct injection/application of particles in groundwater remediation, and use of such particles in fixed bed reactors. Examples of the uses are illustrated in FIGS. 9 to 11.

Figure 9:
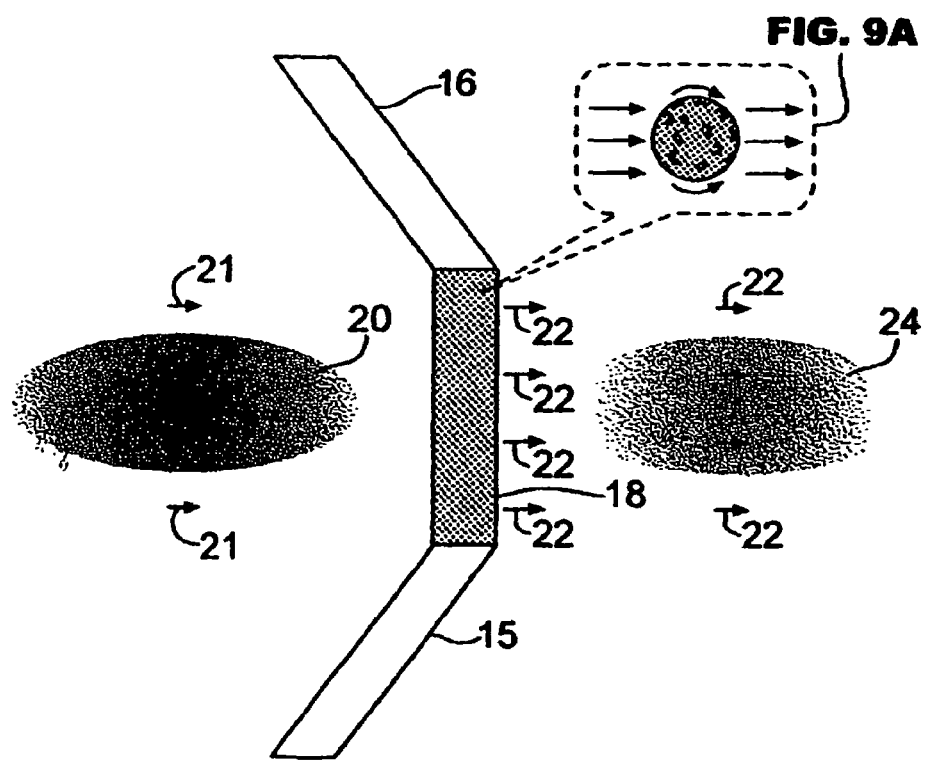
FIG. 9 is a schematic representation of a method and apparatus for treating groundwater according to the present invention using a permeable reactive barrier.

As shown in FIG. 9 the porous iron materials according to the invention can be used in permeable reactive barriers (PRBs) for groundwater treatment. Referring to FIG. 9 the permeable reactive barrier 18 of porous iron particles according to the invention is placed between the low permeability funnel structures 15, 16 to direct a plume of water 20 containing contaminants toward the iron particles in the permeable reactive barrier 18 for reaction and removal of contaminants as the water containing plume moves in the direction shown by the arrows 21. After passing through the permeable barrier 18 the water freed of contaminant continues to flow in the aquifer as shown by arrows 22. The water plume or flow 24 is thus cleaned of contaminants. FIG. 9a is an enlarged schematic representation of a zero valent iron particle according to the invention used in permeable reactive barrier 18.

Figure 10:
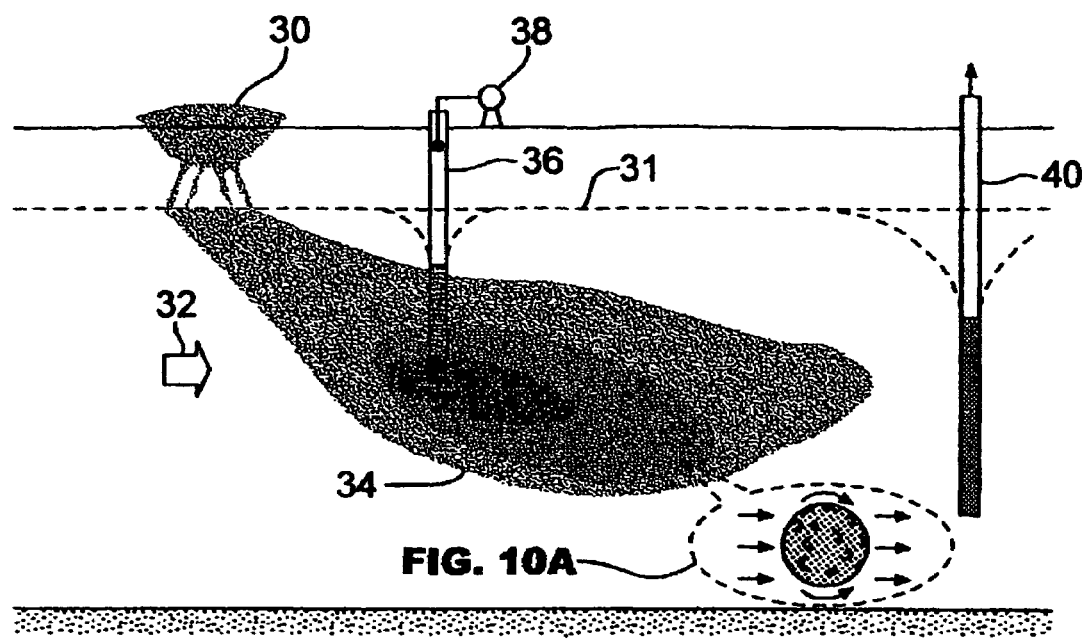
FIG. 10 is a schematic representation of a method and apparatus for groundwater treatment according to the present invention using porous iron particles introduced into the groundwater via an injection well.

FIG. 10 illustrates a process according to the invention using porous zero valent iron particles for in-situ groundwater treatment. As shown in FIG. 10 an injection well 36 is provided upstream of a well 40 used to retrieve groundwater for use as potable water. Injection well 36 is drilled or dug so it intercepts the groundwater containing contaminants, flow below water table 31 represented by arrow 32. Groundwater flow 32 can be contaminated by a source 30 which may originate on the surface. Contaminants 30 enter the groundwater flow and form a contaminated groundwater plume 34. Well 36 is packed with iron particles, according to the invention, using an injection device 38, to a depth necessary to intercept and treat the contaminated water plume 34 prior to the water reaching the normal or productive well 40. Thus the contaminant plume 34 does not reach the production well 40. FIG. 10a is an enlarged schematic representation of a particle injected into the well 36.

Figure 11:
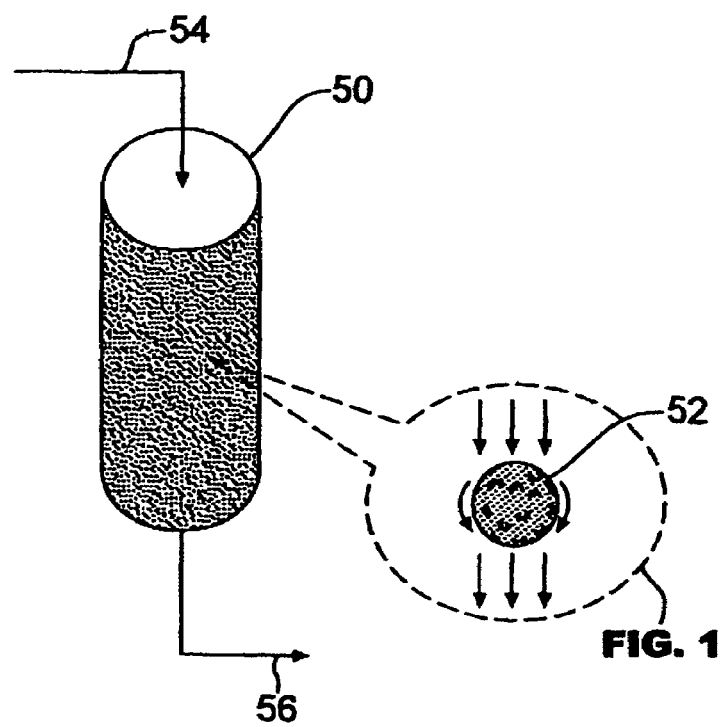
FIG. 11 is a schematic representation of a method of using porous iron particles in a packed bed reactor for aboveground treatment of contaminated groundwater according to the present invention.

FIG. 11 illustrates use of the porous iron particles in a packed bed reactor 50 for above-ground treatment of contaminated groundwater. Reactor 50 is packed with porous zero valent iron particles. A single particle is shown schematically in FIG. 11a. Contaminated water is introduced into the reactor 50 via conduit 54 and clean water is removed from reactor 50 via conduit 56.

Compared to conventional solid iron powders, porous iron materials according to the present invention provide larger surface area for the reactions with contaminants, and higher permeability for groundwater flow.

The hollow/porous iron particles can be modified by adding a second metal such as Pd, Pt, Ag, Co to form bimetallic portions on the surface of the zero valent iron particles. The second metal is typically less reactive than zero-valent iron and serves as a promoter/catalyst for contaminant transformation. The amount of the second metal is typically less than 10% of the total mass.

The hollow/porous iron can also be modified by adding natural or synthetic polymerical materials which can serve as dispersant (deflocculant) to keep colloidal iron particles in suspension.

The hollow/porous iron can be attached or placed onto a solid support such as sand, activated carbon, clay, glass, and/or zeolite.

Having thus described my invention what is desired to be secured by Letters Patent of the United States is set forth in the appended claims.

What is claimed:

1. A method for treatment or remediation of soil or groundwater contaminated with unwanted pollutants comprising the steps of:
   a) preparing generally spherical zero valent iron particles having a diameter no larger than about ten millimeters and a porosity greater than 0.1; and
   b) placing said particles in said soil or a path of groundwater flow; whereby said particles effect reduction of said pollutants.

2. A method according to claim 1 including the step of introducing said zero valent iron particles into an underground aquifer via a test well positioned between a source of pollution and a well used to draw a potable water from said aquifer.

3. A method according to claim 1 including the step of using said zero valent iron particles to form a permeable portion of a barrier placed in an aquifer downstream of pollutant plume in said aquifer.

4. A method according to claim 1 including the step of preparing said zero valent iron particles by:
   a) preparing a generally spherical substrate of a material that can be converted to volatile matter or a gas at elevated temperature;
   b) coating said substrate with metallic iron to form a substantially continuous layer at least 0.25 nm thick;
   c) exposing said coated substrate to one of a chemical reagent or a temperature high enough to remove said substrate to form a hollow iron particle; and
   d) reducing iron oxides in said particle to metallic iron.

5. A method according to claim 4 including forming said zero valent iron particles with an outside diameter less than 10 nm.

6. A method for preparing porous iron particles having a size up to 10 millimeters comprises the steps of:
   a) preparing a generally spherical substrate of a material that can be converted to volatile matter or a gas at elevated temperature;
   b) coating said substrate with metallic iron to form a substantially continuous layer at least 0.25 nm thick;
   c) exposing said coated substrate to one of a chemical reagent or a temperature high enough to remove said substrate to form a hollow iron particle; and
   d) reducing iron oxides in said particle to metallic iron.

7. A method according to claim 6 including the step of forming said substrate with a diameter no larger than about 10 millimeters.

8. A method according to claim 6 including the step of fabricating said substrate from an organic polymer selected from polymers readily fabricated into generally spherical particles less than 10 millimeters in diameter that will accept deposition of an iron coating at least 0.25 nm thick and are readily removable from the iron by thermal or chemical treatment.

9. A method according to claim 6 including selecting a temperature for step (c) no lower than 500° C.

10. A method according to claim 8 including the step of selecting said organic polymer readily converted to volatile or gaseous matter at temperatures of 500° C. or above.

11. A method according to claim 6 including the step of charging said substrate into a solution of one of ferric or ferrous iron.

12. A method for treatment or remediation of groundwater contaminated with unwanted pollutants comprising the steps of:
   a) preparing generally spherical zero valent iron particles having a diameter no larger than about ten millimeters and a porosity greater than 0.1;
   b) charging said particles into a receptacle having an inlet and an outlet defining a pathway through said particles,
   c) introducing said pollutant groundwater into said inlet; and
   d) recovery cleaned water from said outlet.

13. A method according to claim 12 including the step of preparing said zero valent iron particles by:
   a) preparing a generally spherical substrate of a material that can be converted to volatile matter or a gas at elevated temperature;
   b) coating said substrate with metallic iron to form a substantially continuous layer at least 0.25 nm thick;
   c) exposing said coated substrate tone of a chemical reagent or a temperature high enough to remove said substrate to form a hollow iron particle; and
   d) reducing iron oxides in said particle to metallic iron.

14. A method according to claim 12 including forming said zero valent iron particles with an outside diameter less than 10 nm.

15. A generally spherical hollow zero valent iron particle being no larger than about ten millimeters in diameter and having a porosity greater than 0.1.

16. A zero valent iron particle according to claim 15 wherein a second metal selected from the group consisting of Pd, Pt, Ag, Co, or mixtures thereof is added to the surface of said particle in amount so that said second metal is less than about 10% of the total weight of said particle.

17. A zero valent iron particle fabricated by:
   a) preparing a generally spherical substrate of a material that can be converted to volatile matter or a gas at elevated temperature;
   b) coating said substrate with metallic iron to form a substantially continuous layer at least 0.25 nm thick;
   c) exposing said coated substrate to one of a chemical reagent or a temperature high enough to remove said substrate to form a hollow iron particle; and
   d) reducing iron oxide in said particle to metallic iron.

* * * * *

UNITED STATES PATENT AND TRADEMARK OFFICE
CERTIFICATE OF CORRECTION

PATENT NO. : 7,611,637 B2 Page 1 of 1
APPLICATION NO. : 10/567276
DATED : November 3, 2009
INVENTOR(S) : Wei-xian Zhang It is certified that error appears in the above-identified patent and that said Letters Patent is hereby corrected as shown below:

Col. 8, claim 12, line 26, please delete "recovery" and insert --recovering--.
Col. 8, claim 13, line 34, please delete "tone" and insert --to one--.

Signed and Sealed this

Sixth Day of July, 2010

David J. Kappos
*Director of the United States Patent and Trademark Office*